Oct. 27, 1953 H. MILLER Re. 23,727

SWINGABLE DOOR FOR TUMBLER TYPE CLOTHES WASHING MACHINES

Original Filed Dec. 15, 1949 4 Sheets-Sheet 1

INVENTOR.
HERMAN MILLER

BY Raymond F. Thomas
ATTORNEY.

SWINGABLE DOOR FOR TUMBLER TYPE CLOTHES WASHING MACHINES

Original Filed Dec. 15, 1949 4 Sheets-Sheet 2

INVENTOR.
HERMAN MILLER

BY

Raymond H. Vernes
ATTORNEY.

SWINGABLE DOOR FOR TUMBLER TYPE CLOTHES WASHING MACHINES

Original Filed Dec. 15, 1949 4 Sheets-Sheet 3

INVENTOR.
HERMAN MILLER

BY

Raymond H. Nemes
ATTORNEY.

SWINGABLE DOOR FOR TUMBLER TYPE CLOTHES WASHING MACHINES

Original Filed Dec. 15, 1949 4 Sheets-Sheet 4

INVENTOR.
HERMAN MILLER

BY

Raymond A. Flemes
ATTORNEY.

Reissued Oct. 27, 1953 Re. 23,727

UNITED STATES PATENT OFFICE 23,727

SWINGABLE DOOR FOR TUMBLER TYPE CLOTHES WASHING MACHINES

Herman Miller, Detroit, Mich., assignor to Miller Laundry Machinery Co., Detroit, Mich., a corporation of Michigan Original No. 2,639,601, dated May 26, 1953, Serial No. 133,091, December 15, 1949. Application for reissue July 1, 1953, Serial No. 365,571

3 Claims. (Cl. 68—139)

Matter enclosed in heavy brackets [ ] appears in the original patent but forms no part of this reissue specification; matter printed in italics indicates the additions made by reissue.

This invention relates to washing machines and, in particular, it relates to washing machines of the commercial type in which a perforated container is rotatably mounted within an outer cylinder. More particularly, the invention relates to a commercial washing machine of the cylindrical type having a removable end and disposed on a horizontal axis for normal operation, and including means for tilting the container for loading and for tilting the container in an opposite direction for unloading.

Most commercial washing machines of the horizontal cylindrical type include a door along one side and above the water line. This door is used for loading and unloading the laundry. When laundry is unloaded from such a washing machine it involves a considerable manual task because the laundry is wet and heavy and the operator must reach in the container and lift the wet laundry therefrom.

In the practice of my invention, I provide a commercial washing machine in which a perforated container rotates within an outer cylinder. One end of the machine is provided with a door which functions to seal both the inner container and the outer container while permitting the inner container to rotate freely. The machine of my invention also includes means for elevating the entire container at one end so as to facilitate loading by raising the loading end to an elevated position. The machine also includes means for elevating the opposite end of the container so that when the door is opened and the perforated container is rotated the laundry progressively moves out of the end of the machine.

Among the objects and advantages of my invention are to provide a washing machine which is automatic in unloading laundry therefrom; to provide a washing machine with an open end which may be partly elevated to facilitate loading; to provide a washing machine of the open end type which is provided with a novel door construction to permit separate enclosures for an outer cylinder and an inner perforated container; to provide a washing machine of the cylindrical type which may be elevated at either end of the cylinder; to provide a washing machine having an automatic door opening and closing mechanism including a locking device for the door when in its closed position; and, to provide a washing machine of the character described which is economical to manufacture and which is efficient and economical to operate.

These and other objects and advantages will appear more fully in the following detailed description when considered in connection with the accompanying drawings, in which.

Figure 1:
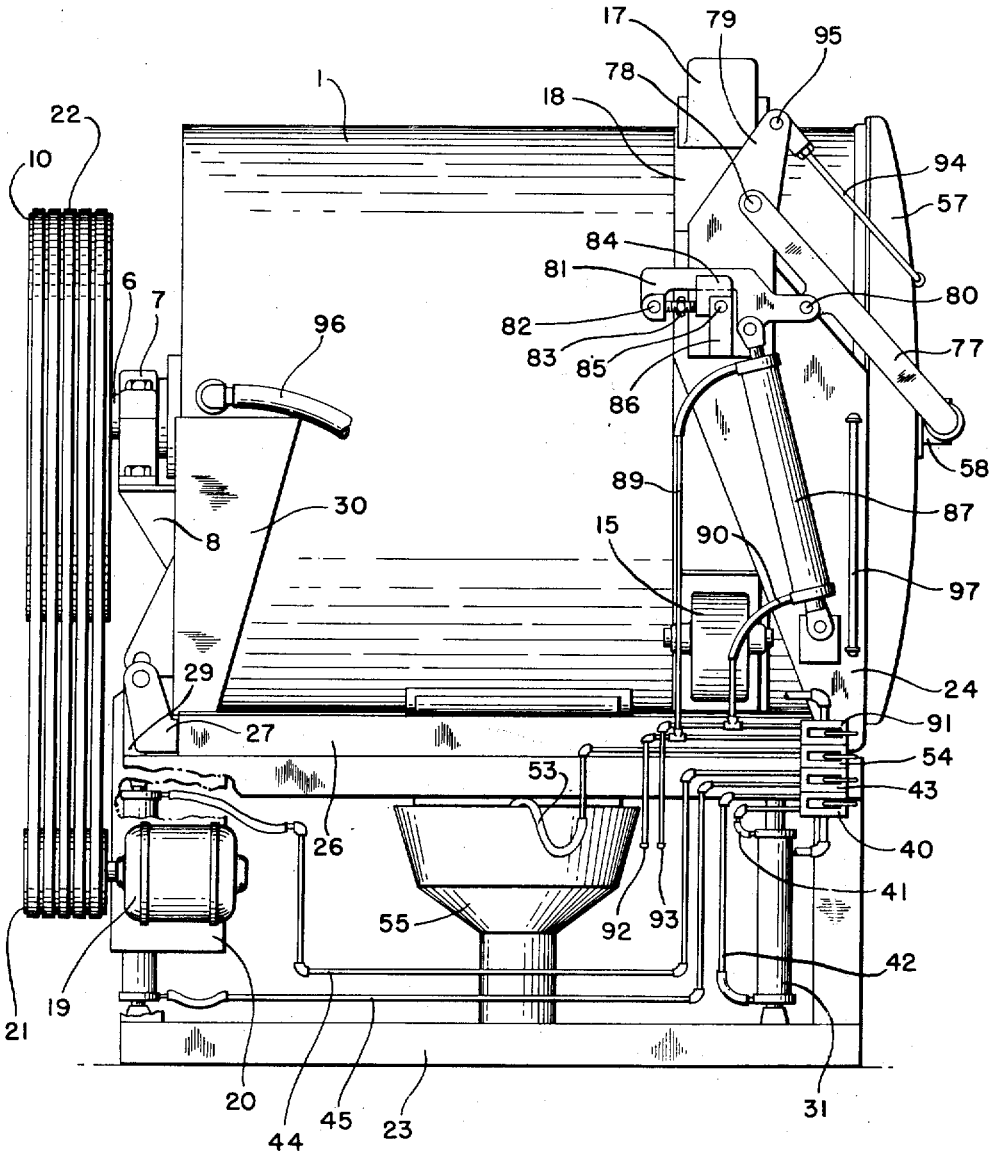
Figure 1 is a side elevational view of a washing machine embodying the features of my invention.
Figure 2:
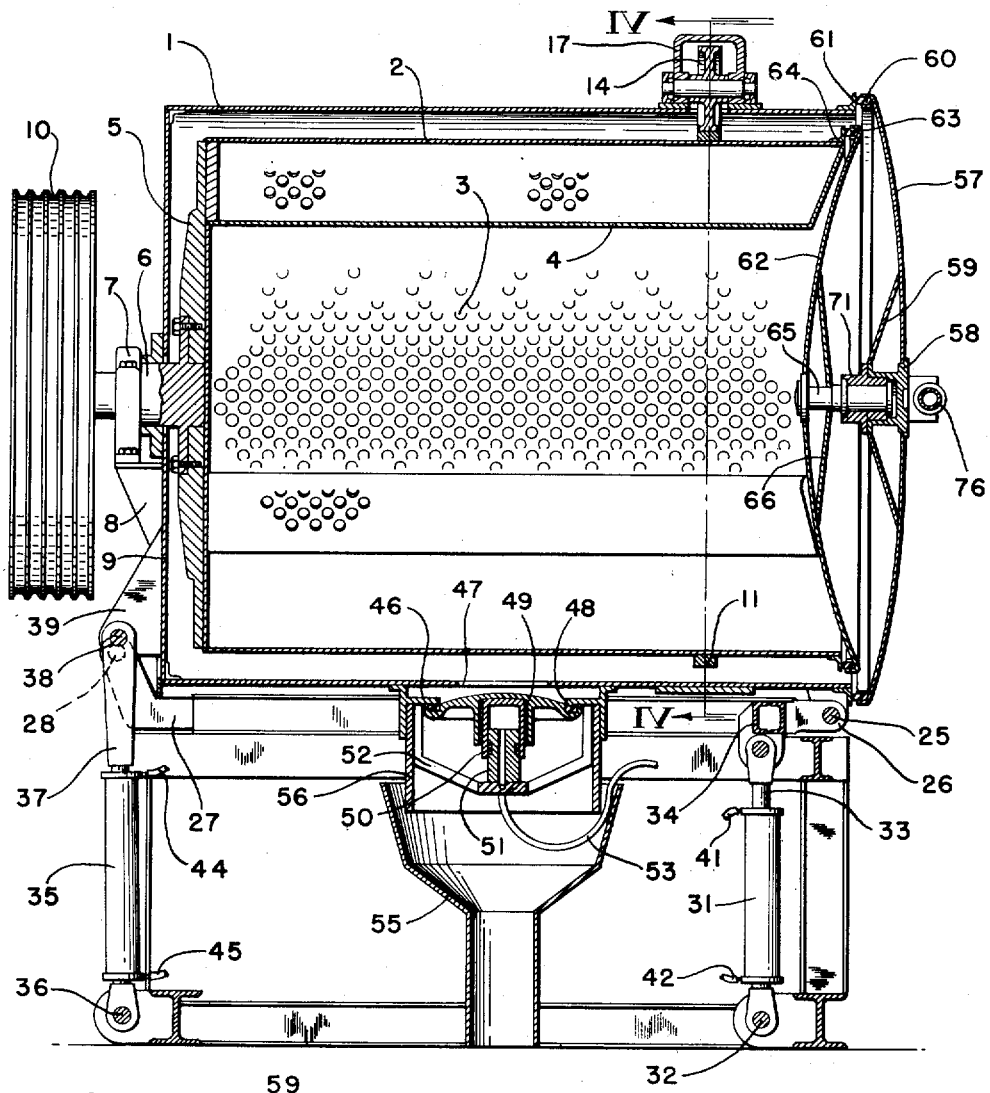
Figure 2 is a similar view thereof except that the machine is partly in section through the longitudinal axis thereof.

With reference to the drawings and, in particular, to Figures 1 and 2, I show an embodiment of my invention constituting, essentially, an outer cylindrical container 1 and an inner cylindrical container 2. Both of these containers are positioned in a horizontal axis. The outer container constitutes an enclosure for retaining water in which the laundry is washed. The inner container 2 is rotatable within the outer container and includes perforations 3 extending through the walls throughout the major portion of the container. Also included within the inner container is a plurality of ribs 4 which project inwardly of the container and serve as means for lifting the laundry as the container is rotated. This is in accordance with conventional practice in washing machines of the cylindrical type. Both the outer and inner containers 1 and 2, respectively, are provided with open ends at the same end.

The inner container 2 is axially rotatable within the outer container 1. A trunnion 5 is attached to the closed end of the inner container 2 and is connected to a shaft 6 supported by a bearing 7. The bearing in turn rests upon a bracket 8 attached to an end plate 9 of the outer container 1. A pulley 10 keyed to the shaft 6 completes the mechanism for supporting one end of the inner container 2.

Figure 4:
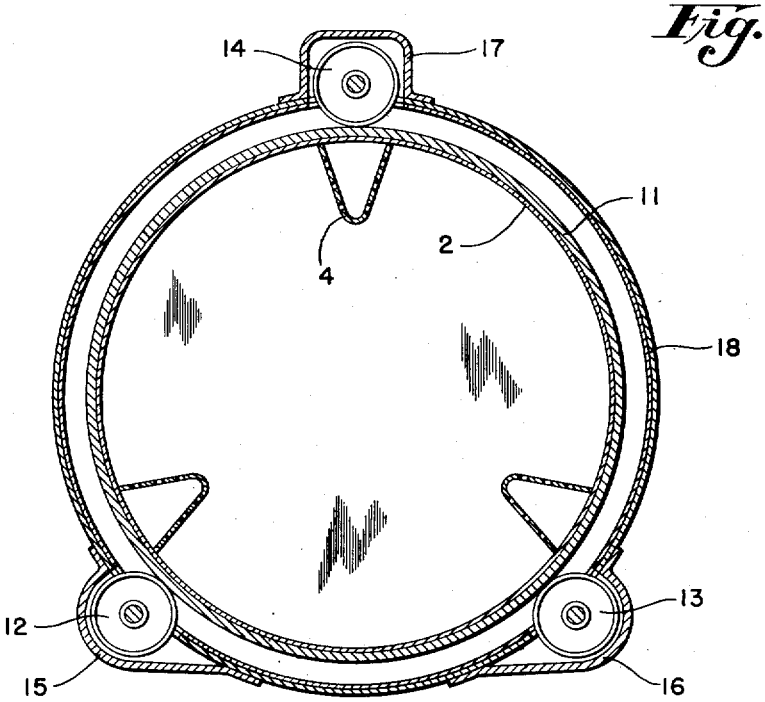
Figure 4 is a transverse view, in section, of the cylindrical member of the machine taken along lines IV—IV of Figure 2.

Near the open end of the inner container 2 is a band 11 attached to the outer perimeter of the container. This band serves as a track which contacts three rollers 12, 13, and 14 (Figure 4).

The rollers 12 and 13 are supported by housings 15 and 16, respectively, attached to the outer container 1. Also, a housing 17 attached to the container 1 supports the roller 14. These housings 15, 16 and 17 are attached to the container 1 as by means of a welding operation so that they provide a fluid tight connection therewith. The reinforcing band 18 forming a part of the outer container 1 serves as a means to strengthen the outer container at the location of the supporting rollers 12, 13 and 14. By this arrangement the axial shaft 6 supports the rotatable container 2 at one end while the rollers 12, 13 and 14 support the container at the opposite end. This leaves the open end of the containers free of any axial supporting means, or other restriction, which might interfere with the loading and unloading of laundry relative to the container.

The inner container is driven by means of a motor or combination motor and reduction unit 19 attached to a bracket 20 which extends upwardly and fastens to the end plate 9 of the outer container 1. A pulley 21 is keyed to the motor 19 and by means of a plurality of V-shaped belts 22 engages with and drives the pulley 10. By means of this direct drive and the attachment of the motor base to the end plate of the outer container 1 the cylinders, as hereinafter described, may be elevated without interfering with the drive arrangement.

The outer container 1 is maintained in an elevated position and is supported by a frame 23. A pair of plates 24 (Figure 1) positioned at either side of the container 1 and at the open end thereof is welded to the reinforcing band 18 which extends around the container. At the bottom of the plates 24 is a pivotal connection 25 (Figure 2) which connects to a pair of horizontal beams 26 resting upon the frame 23. The opposite end of the beams 26 includes a bracket 27 having a pivot 28 which attaches to another bracket 29 welded to the frame 23. The beams 26 serve as a cradle upon which the cylinder 1 is supported. The front or open end of the cylinder joins with the pivot 25, and the rear end of the container is provided with a pair of plates 30 (Figure 1), the bottom portion of which is supported by resting upon the pair of beams 26.

In its normal horizontal position, the cylinder rests securely upon the cradle formed by the horizontal beams 26. Means are provided for elevating either the front or rear end of the containers. The front end may be elevated by a fluid operable cylinder 31 pivotally connected at 32 (Figure 2) to the frame 23. The opposite end of the cylinder 31 includes a piston rod which pivotally connects to a cross bar 34 operating to join the horizontal beams 26 together to form a rigid cradle.

At the rear end of the container a cylinder 35 pivotally joined at 36 to the frame 23 is provided with a piston extension 37 pivoted at 38 to a bracket 39 welded to the end plate 9 of the container 1.

Figure 5:
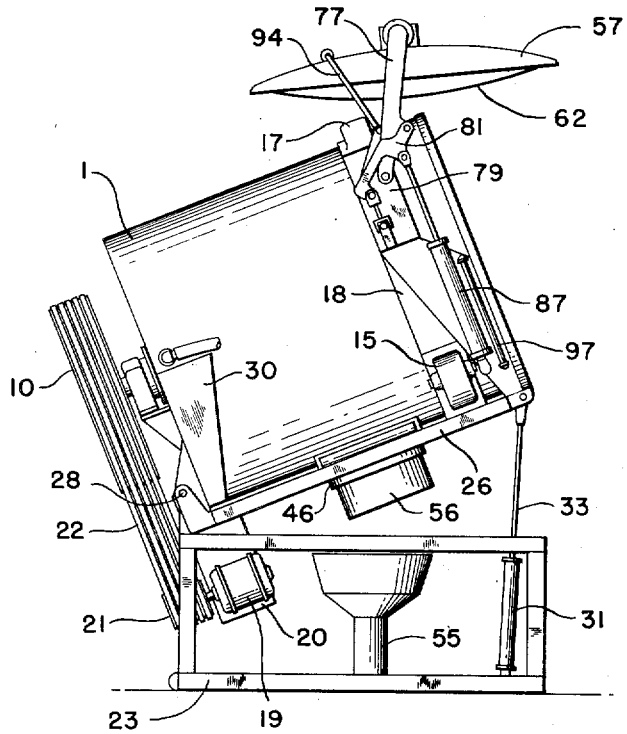
Figure 5 is a side elevational view of the machine with the front end elevated for loading purposes.

Operation of the cylinder 31 is accomplished by means of a conventional fluid operable valve 40 (Figure 1). Conduits 41 and 42 leading from the valve 40 connect with the cylinder 31 so as to cause the cylinder 31 to be actuated in accordance with operation of the valve 40. When this valve 40 is in operating position the piston 33 of the cylinder 31 becomes extended and causes the containers to move about the pivot 28 so as to elevate the front end of the containers to a position such as shown in Figure 5. A second actuation of the valve 40 causes the piston in cylinder 31 to recede and lower the containers to their normal horizontal position.

Figure 6:
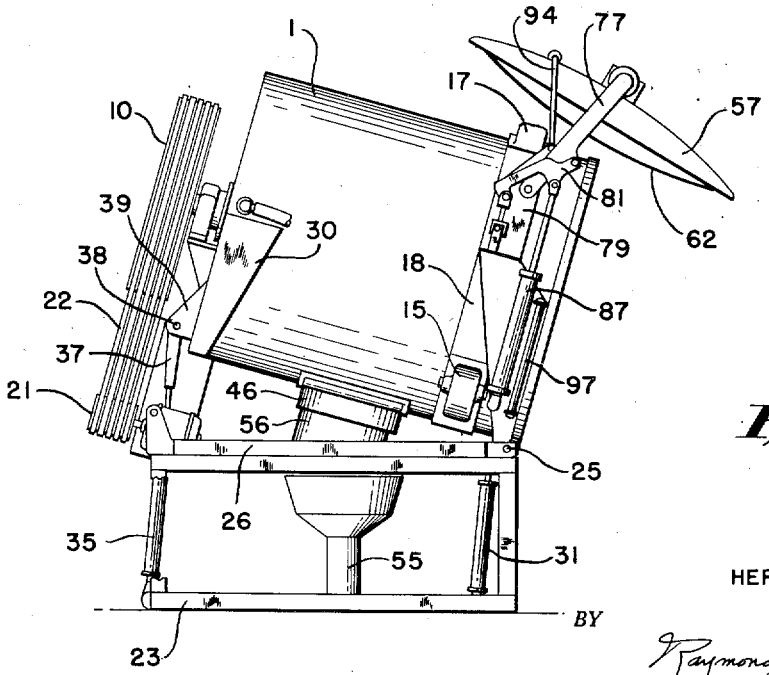
Figure 6 is a side elevational view of the machine with its rear end elevated in unloading position.

In a somewhat similar manner the rear end of the containers may be elevated. In this case a valve 43 connects to the cylinder 35 by means of conduits 44 and 45. Operation of the valve 43 actuates the cylinder 35 to elevate the rear end of the containers. In this case the containers swing about the pivot 25 so as to elevate the rear of the containers to a position such as shown in Figure 6. A reverse operation of the valve 43 allows the containers to resume their horizontal position.

As shown in Figure 2, a drain mechanism is associated with the underside of the container 1. Essentially, this consists of a housing 46 attached to the underside of the container 1. An aperture 47 through the wall of the bottom of the container provides an outlet from the container. The housing 46 also includes an aperture 48 which is closeable by a valve 49. A portion of the valve 49 includes a cylinder-like member 50 which engages with a piston 51. The piston 51 is connected to a bracket 52 attached to the housing 46. A flexible conduit 53 communicates to the interior of the cylinder 50 and to a valve 54 (Figure 1). While fluid pressure is maintained in the conduit 53 the valve 49 is held firmly against the housing 46 so as to seal the opening 48 and prevent leakage of the container during its operating cycle. When it is desired to allow the water to run from the container 1, the valve 54 is actuated to open the conduit 53 to a drain whereby the weight of the water in the container acting against the valve 49 causes the valve to open and the water rushes out of the container. A funnel 55 connects to a drain and collects the water released when the valve 49 is open. A shield 56 forms an extension to the housing 46 and overlaps the funnel member 55 so as to insure the water passing into the drain. When the machine is again ready for operation the valve 54 is again actuated to close the valve 49.

An essential feature of the washing machine is a door which operates to close the open ends of the containers 1 and 2. This door is so arranged that it enables a complete enclosure of the outer container 1 while at the same time providing a separate closure for the container 2 which is rotatable within the container 1. This arrangement takes the form of an outer door 57 circular in shape and having a bowed cross-section. A central portion constitutes a hub 58 while a reinforcing member 59 is welded to the hub and to the door 57 for purposes of strengthening the door and holding it in proper alignment. At the outer rim of the door 57 is a sealing member 60 which is adapted to press tightly against an angle band 61 positioned around the edge of the container 1. Wholly supported by the outer door is an inner door 62. This door is also circular, and in cross-section it is curved inwardly which is directly opposite to the outwardly curved section of the outer door 57. A sealing gasket 63 extends around the rim of the door 62 and is engageable with an angle band 64 attached to the outer edge of the inner container 2.

Figure 7:
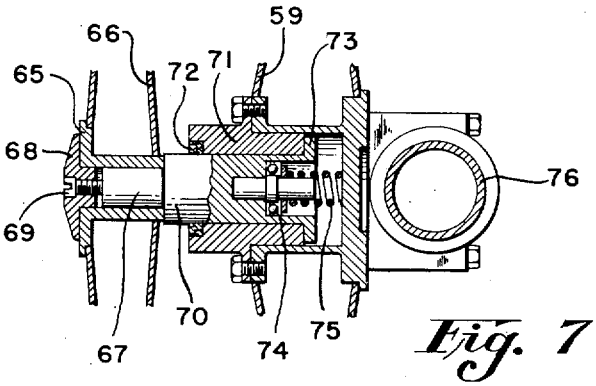
Figure 7 is an enlarged view, in section, of the central portion of the doors shown in Figure 2.
Figure 3:
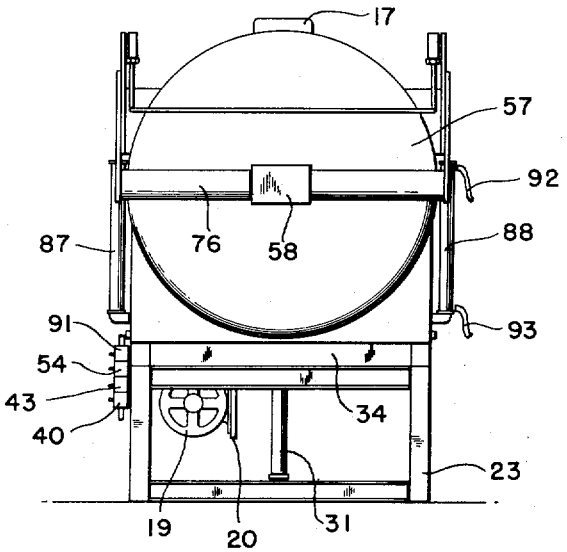
Figure 3 is a front elevational view of the machine.

Means for supporting the inner door 62 is shown, in particular, in Figure 7. A hub 65 constitutes the center of the inner door 62. A reinforcing disk 66 is also welded to one end of the hub and to the door 62 for maintaining the door in rigid assembly. Within the hub 65 is a shaft 67 attached to the hub by means of a cap 68 and machine screw 69. An extension 70 of the shaft 67 fits within a bearing 71 attached to the hub 58. The extension 70 is rotatable within the bearing 71 and a packing gland 72 keeps water out of the rotating joint. At the inner end of the extension 70 is a flange 73 which limits the inward movement of the door 62. Within the extension 71 is a thrust bearing 74 and a spring 75 which presses against the thrust bearing and is retained by the end of the hub 58. This spring allows a limited amount of axial movement between the door 62 and the door 57. Thus, when the doors are brought into closing position against the ends of the containers 1 and 2, the door 62 first engages the inner container 2, then the door 57 compresses the spring 75 slightly before the door 57 is in tight engagement with the container 1. This door construction allows the inner container 2 to rotate freely, and the door 62 rotates with the container while the outer door remains fixed in a stationary position relative to the container 1.

In order to open and close the door I provide a tubular member 76 extending across the front of the door 57 and attached thereto at the hub 58. An arm 77 (Figure 1) is attached to one end of the tubular member 76 and is pivoted at 78 to a bracket 79 welded to the band 18 extending around the container 1. At an intermediate portion along the arm 77 is a pivot 80 which joins a latch 81 pivotally connected at 82 to an adjusting screw 83 which in turn engages a block 84 pivotally attached at 85 to a post 86 projecting from the bracket 79. This mechanism provides a means by which the door may be opened and closed, and when closed it is held in locked position. Not only is the door held in locked position, but it is held in tight engagement with the outer container 1 so that no leakage will occur. The adjusting screw 83 permits an accurate tight fit of the outer door 57. It is to be understood that a similar mechanism is on the opposite side of the container and functions simultaneously in the same identical manner Because of the tight fit of the door, it is possible to increase the pressure within the container by means of an inlet through which steam may be introduced. Thus by operating at a pressure up to about five pounds per square inch, it is possible to increase the water temperature for facilitating the washing operation.

For operation of the door, cylinders 87 and 88, one on each side of the door, are pivotally attached at one end to the bracket 24 and at the opposite end to the latch 81. The cylinder 87 through conduits 89 and 90 communicates with a valve 91. Similarly, the cylinder 88 through conduits 92 and 93 also communicates to the same valve 91. Operation of the valve 91 causes the cylinders 87 and 88 to actuate, releasing the locking mechanism and leaving the door 57 in the position as shown in Figures 5 and 6. To prevent the door from swinging loosely relative to the arm 77, a rod 94 pivotally connected at 95 to the bracket 79 is attached to the front of the door 57.

Hot water is fed into the container through the conduit 96, and the amount of liquid that enters the container can be ascertained by the glass liquid level gauge 97.

At the start of the operation of the apparatus, there is no water in the container and valve 40 is actuated so as to elevate the front end of the container to a position such as shown in Figure 5.

Also, in this position the door is open, as shown. In this elevated position an operator tosses the desired quantity of laundry into the inner container 2. When this is accomplished the door is closed by actuation of the valve 91. Also, valve 40 is operated. This brings the container into a horizontal position and water is introduced. Detergent may be added while the door is still open or it may be injected into the water flow, or it may be added through a separate small door (not shown) specifically for this purpose. When the desired amount of water enters the container the motor 19 is started and the inner cylinder 42 is rotated. This rotation may be constant in one direction or it may be reversed in an intermittent manner. After a proper period of washing cycle is completed the drain valve is opened by operation of valve 54 and the water is permitted to run from the container. Thereafter the drain valve is closed and fresh water is introduced into the container to provide a rinsing cycle. One or more rinsing operations may be required. At the end of the final rinsing operation, the drain valve is again opened to allow the water to run from the container. The inner container may still rotate so as to tumble the laundry and express additional water from the laundry. Thereafter, valve 91 is actuated to open the doors and valve 43 is also operated to raise the rear end of the container. This places the apparatus in the position illustrated by Figure 6. In this position a basket is placed on the floor at the open end of the apparatus and as the inner container continues to rotate, the laundry is tumbled out of the container and into the basket, or other means for receiving the wet or washed laundry. When the laundry is removed therefrom the motor is stopped, the containers returned to their horizontal position, and again the front end is elevated as shown in Figure 5, and the apparatus is in a position to continue a similar cycle of operation.

As thus shown and described, it is believed apparent that I have provided a novel arrangement for washing laundry by means of a commercial laundry apparatus, wherein the washing machine is capable of being placed in the most advantageous positions to facilitate washing and to reduce manual labor. While I have shown a preferred embodiment of my invention, it is to be understood that it is susceptible to those modifications which appear obviously within the scope of the invention and within the scope of the appended claims.

Having thus described my invention, what I claim and desire to protect by Letters Patent is:

1. [A washing machine] *Laundry handling equipment* comprising a horizontally disposed cylindrical tank having an open end, a perforated cylindrical container rotatable within the cylindrical tank and having an open end the diameter of which is substantially equal to the diameter of the perforated container, means for rotating the cylindrical container, a composite door forming a separate closure for the open end of the cylindrical [door] *tank* and the cylindrical container, a horizontal bar attached to the center of the door, arms engaging opposite ends of the bar and pivotally attached to the sides of said tank, and hydraulically operable means for swinging the arms to open the composite door and elevate the door above the openings of said cylinder and tank.

2. [A washing machine] *Laundry handling*

*equipment* comprising a horizontally disposed cylindrical tank having an open end, a perforated cylindrical container rotatable within the cylindrical tank and having an open end the diameter of which is substantially equal to the diameter of the perforated container, means for rotating the cylindrical container, a composite door forming a separate closure for the open end of the cylindrical [door] *tank* and the cylindrical container, a horizontal bar attached to the center of the door, arms engaging opposite ends of the bar and pivotally attached to the sides of said tank, hydraulic means for swinging the arms to open the composite door and elevate the door above the openings of said cylinder and tank, and means associated with the swinging and elevating means for automatically locking said arms against movement axially of the tank when the door is in closed position.

3. [A washing machine] *Laundry handling equipment* comprising a horizontally disposed cylindrical tank having an open end, a perforated cylindrical container rotatable within the cylindrical tank and having an open end the diameter of which is substantially equal to the diameter of the perforated container, means for rotating the cylindrical container, a composite door forming a separate closure for the open end of the cylindrical [door] *tank* and the cylindrical container, a horizontal bar attached to the center of the door, arms engaging opposite ends of the bar and pivotally attached to the sides of said tank, a latch pivoted to each of said arms, a link pivoted to each of said latches and to the sides of said tank, and fluid operable piston and cylinder connection between said tank and said latch for releasing said latch and swinging said links to open the composite door and elevate the door above the openings of said cylinder and tank.

HERMAN MILLER.

References Cited in the file of this patent or the original patent

UNITED STATES PATENTS

| Number | Name | Date |
|---|---|---|
| 683,816 | Towers | Oct. 1, 1901 |
| 1,100,334 | White | June 16, 1914 |
| 1,144,191 | Gray | June 22, 1915 |
| 1,394,631 | Luschka | Oct. 25, 1921 |
| 2,066,998 | Nash | Jan. 5, 1937 |
| 2,105,248 | Johnson | Jan. 11, 1938 |
| 2,118,582 | Zimarik | May 24, 1938 |
| 2,289,162 | Amonsen | July 7, 1942 |
| 2,309,940 | Douglas | Feb. 2, 1943 |
| 2,420,411 | Blount | May 13, 1947 |
| 2,428,489 | Goodreau | Oct. 7, 1947 |
| 2,575,673 | Miller | Nov. 20, 1951 |